US012760739B2

(12) United States Patent
Peer et al.

(10) Patent No.: US 12,760,739 B2
(45) Date of Patent: Oct. 13, 2026

(54) SPLIT CASING INCLUDING A COMPLIANT ELEMENT

(71) Applicant: Siemens Energy, Inc., Orlando, FL (US)

(72) Inventors: David J. Peer, Smethport, PA (US); David Andrew Taylor, Issaquah, WA (US); Andrew J. Ranz, Enfield, CT (US); Kyle Badeau, Newcastle, WA (US)

(73) Assignee: SIEMENS ENERGY, INC., Orlando, FL (US)

( * ) Notice: Subject to any disclaimer, the term of this patent is extended or adjusted under 35 U.S.C. 154(b) by 16 days.

(21) Appl. No.: 19/107,065

(22) PCT Filed: Oct. 6, 2023

(86) PCT No.: PCT/US2023/034618
§ 371 (c)(1),
(2) Date: Feb. 27, 2025

(87) PCT Pub. No.: WO2024/076721
PCT Pub. Date: Apr. 11, 2024

(65) Prior Publication Data

US 2026/0063129 A1 Mar. 5, 2026

Related U.S. Application Data

(60) Provisional application No. 63/378,689, filed on Oct. 7, 2022.

(51) Int. Cl.

| | |
|---|---|
| ***F04D 17/12*** | (2006.01) |
| ***F04D 29/28*** | (2006.01) |
| ***F04D 29/42*** | (2006.01) |

(52) U.S. Cl.
CPC ......... *F04D 17/125* (2013.01); *F04D 29/286* (2013.01); *F04D 29/4206* (2013.01); *F05D 2300/5021* (2013.01)

(58) Field of Classification Search
CPC ...... F04D 17/125; F04D 29/286; F04D 1/063; F04D 17/122; F05D 2300/5021; F05D 2230/642
See application file for complete search history.

(56) References Cited

U.S. PATENT DOCUMENTS

| | | | | |
|---|---|---|---|---|
| 3,801,217 | A * | 4/1974 | Ryall | F04D 1/063 415/214.1 |
| 6,471,468 | B1 * | 10/2002 | Hartmann | F04D 1/063 415/135 |

(Continued)

FOREIGN PATENT DOCUMENTS

| | | | |
|---|---|---|---|
| DE | 518178 | C | 2/1931 |
| JP | 2003269390 | A | 9/2003 |

OTHER PUBLICATIONS

PCT International Search Report and Written Opinion of International Searching Authority mailed Jan. 29, 2024 corresponding to PCT International Application No. PCT/US2023/034618 filed Oct. 6, 2023.

*Primary Examiner* — Justin D Seabe

(57) ABSTRACT

A machine includes a rotor supported for rotation about a rotational axis, an outer casing having an inner bore, and an inner casing disposed within the inner bore and surrounding a portion of the rotor, the inner casing including a first joint interface. A head member is disposed within the inner bore and includes a first joint interface that engages a second joint interface to form a joint therebetween. A compliant element is formed as part of the first joint interface and arranged to (Continued)

allow for movement of the second joint interface along the rotational axis in response to the thermal expansion of the inner casing.

17 Claims, 3 Drawing Sheets

(56) References Cited

U.S. PATENT DOCUMENTS

| | | | | |
|---|---|---|---|---|
| 10,393,148 | B2 * | 8/2019 | Bergamini ............ | F04D 29/628 |
| 10,876,428 | B2 * | 12/2020 | Weisbrod .............. | F01D 25/145 |
| 2020/0271126 | A1 * | 8/2020 | Kunishi ................ | F04D 29/624 |

* cited by examiner

SPLIT CASING INCLUDING A COMPLIANT ELEMENT

BACKGROUND

Multi-stage centrifugal compressors are used to pressurize gasses including air, hydrogen, natural gas, and the like. During operation, significant heat can be generated through the compression process. The hot compressed gas in turn heats the components of the compressor and may cause differential thermal expansion that if not accounted for can reduce the operating life of the various components. In addition, large compressors may have restricted start times or other operational limitations that are designed to reduce differential thermal expansion. These requirements can reduce the overall efficiency and operational flexibility of the compressor.

SUMMARY

In one embodiment, a rotor supported for rotation about a rotational axis, an outer casing having an inner bore, and a head member disposed within the inner bore and including a first joint interface. The machine also includes an inner casing disposed within the inner bore and surrounding a portion of the rotor, the inner casing including a second joint interface that engages the first joint interface to form a joint therebetween and a compliant element formed as part of one of the first joint interface and arranged to allow for movement of the second joint interface along the rotational axis in response to thermal expansion of the inner casing.

In another embodiment, a machine includes a rotor supported for rotation about a rotational axis, an outer casing having an inner bore, and an inner casing disposed within the inner bore and surrounding a portion of the rotor. The machine also includes a head member disposed within the inner bore and coupled to the inner casing to form a joint therebetween, a first joint interface formed as part of one of the inner casing and the head member, the first joint interface including a first joint face and a first groove that each extend around a portion of a circumference of the one of the inner casing and the head member, and a second joint interface formed as part of the other of the inner casing and the head member, the second joint interface including a second joint face and a second groove that each extend around a portion of a circumference of the other of the inner casing and the head member. The machine further includes a compliant element formed as part of the second joint interface and positioned between the second joint face and the second groove, the compliant element arranged to allow movement of the one of the first joint interface and the second joint interface along the rotational axis in response to thermal expansion of the inner casing.

The foregoing has broadly outlined some of the technical features of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the Detailed Description below, it should be understood that various definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
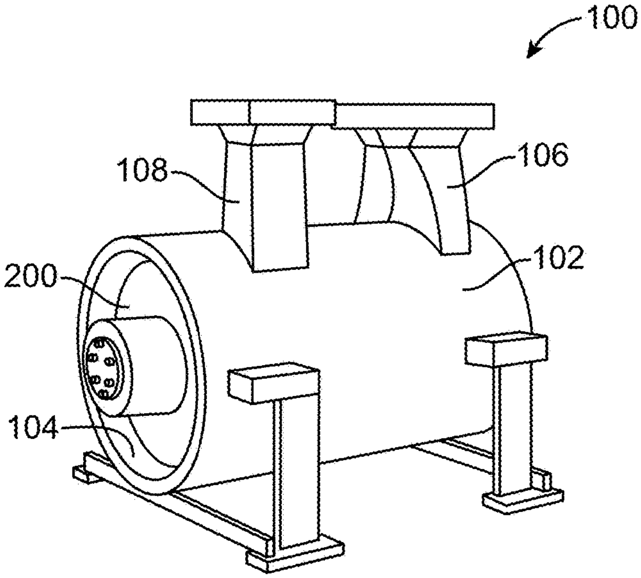
FIG. 1 is a perspective view of a machine in the form of a compressor in accordance with an embodiment.

Before any embodiments of the invention are explained in detail, it is to be understood that the invention is not limited in its application to the details of construction and the arrangement of components set forth in this description or illustrated in the following drawings. The invention is capable of other embodiments and of being practiced or of being carried out in various ways. Also, it is to be understood that the phraseology and terminology used herein is for the purpose of description and should not be regarded as limiting.

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Words or phrases used herein should be construed broadly, unless expressly limited in some examples. For example, the terms "including," "having," and "comprising," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Furthermore, while multiple embodiments or constructions may be described herein, any features, methods, steps, components, etc. described with regard to one embodiment are equally applicable to other embodiments absent a specific statement to the contrary.

Also, although the terms "first", "second", "third" and so forth may be used herein to refer to various elements, information, functions, or acts, these elements, information, functions, or acts should not be limited by these terms. Rather these numeral adjectives are used to distinguish different elements, information, functions or acts from each other. For example, a first element, information, function, or act could be termed a second element, information, function, or act, and, similarly, a second element, information, function, or act could be termed a first element, information, function, or act, without departing from the scope of the present disclosure.

In addition, the term "adjacent to" may mean that an element is relatively near to but not in contact with a further element or that the element is in contact with the further portion unless the context clearly indicates otherwise. Further, the phrase "based on" is intended to mean "based, at least in part, on" unless explicitly stated otherwise. Terms "about" or "substantially" or like terms are intended to cover variations in a value that are within normal industry manufacturing tolerances for that dimension. If no industry standard is available, a variation of twenty percent would fall within the meaning of these terms unless otherwise stated.

Referring now to FIG. 1, a machine in the form of a compressor 100 that includes an outer casing 102 that defines an inner bore 104 and a cartridge 200 disposed at least partially within the inner bore 104 is shown. The outer casing 102 includes a continuous cylindrical body that is open at each end with the inner bore 104 extending therebetween. In one embodiment, a fluid inlet 106 is formed as part of the outer casing 102 to provide a flow path from a source of fluid to the inner bore 104. In another embodiment, a fluid inlet 106 is affixed to the outer casing 102 to provide a flow path from a source of fluid to the inner bore 104. Likewise, a fluid outlet 108 may be formed as part of the outer casing 102, or affixed to the outer casing 102, to provide a flow path out of the inner bore 104 to allow for the delivery of compressed fluid to a point of use, a storage component, or any other desired location. The compressor 100 is configured to compress any gaseous fluid including, but not limited to air, hydrogen, natural gas, carbon dioxide, and the like.

Figure 2:
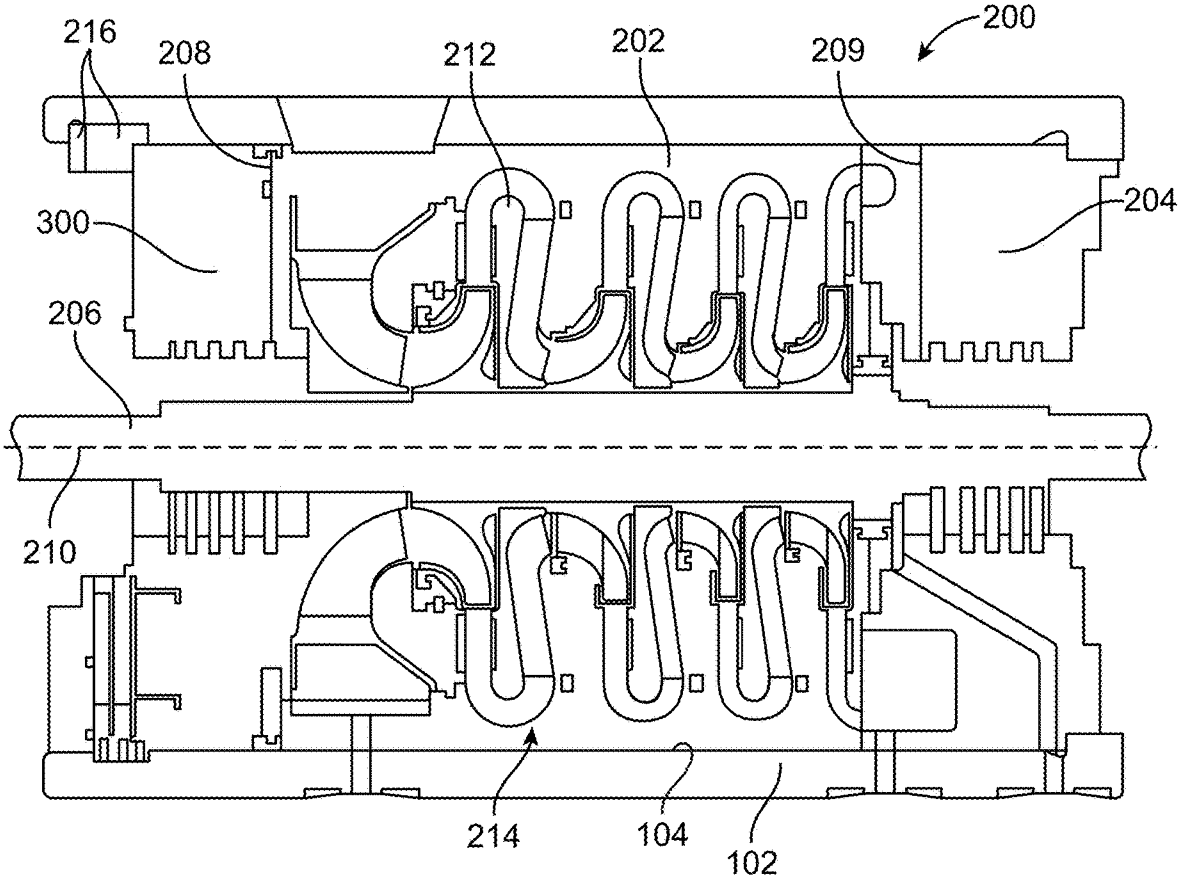
FIG. 2 is a cross-sectional view of a compressor in accordance with an embodiment.

In one embodiment, the cartridge 200, better illustrated in FIG. 2, is an assembly of components that can be inserted into and removed from the outer casing 102 as a single assembled unit in an axial direction. The cartridge 200 will be described in greater detail with reference to FIG. 2 and FIG. 3.

The compressor 100 of FIG. 1 is sometimes referred to as a barrel-type compressor or a vertically split compressor. It should be noted that while the machine described herein is a compressor 100, other machines could also incorporate the features and components described herein. For example, the machine could include a pump, a turbine, an expander, or other turbomachine as may be desired.

Referring now to FIG. 2, a cartridge 200 that is configured to be installed within the inner bore 104 of the outer casing 102 in accordance with an embodiment is shown. The cartridge 200 includes an inner casing 202, a first head member 300, a second head member 204, and a rotor 206. In one embodiment, the inner casing 202 is annular thus defining an interior, and is sized to fit within the inner bore 104. Apertures are formed in the inner casing 202 to allow for the flow of fluid into and out of the interior of the inner casings 202. The inner casing 202 includes two ends that allow for the insertion of the rotor 206.

In one embodiment, the first head member 300 attaches to one end of the inner casing 202 to define a joint 208 therebetween. The joint 208 extends around the circumference of the inner casing 202 and the first head member 300. In one embodiment, the joint 208 is normal to a rotational axis 210 of the rotor 206. In this arrangement, where the rotational axis 210 is generally horizontal, the joint 208 is vertical and thus defines a vertically split casing arrangement.

In one embodiment, the second head member 204 attaches to a second end of the inner casing 202 opposite the first head member 300 to form a second joint 209 therebetween. The second joint 209 extends around the circumference of the inner casing 202 and the second head member 204 and is generally normal to the rotational axis 210 of the rotor 206. Thus, the second joint 209 is also generally vertical.

In one embodiment, the rotor 206 is disposed at least partially within the inner casing 202 and is supported for rotation about the rotational axis 210. One or more centrifugal impellers 212 are formed as part of the rotor 206 or attached to the rotor 206 for co-rotation. A corresponding number of diffusers and other flow-guiding components are formed as part of the inner casing 202 or attached to the inner casing 202 to guide the fluid and to cooperate with one or more centrifugal impellers 212 to define one or more compression stages 214. In a multi-stage compressor 100, several centrifugal impellers 212 cooperate with the inner casing 202 to define several compression stages 214 that are arranged in series or in parallel to achieve the desired flow rate and compression ratio for the compressor 100.

In one embodiment, once the cartridge 200 is inserted into the outer casing 102, the cartridge 200 is secured inside the outer casing 102 by placing one or more shear rings 216 between the head member 300 and the outer casing 102. The shear rings 216 are annular rings that have an outer diameter that is larger than the outer diameter of the cartridge 200 and an inner diameter that is smaller than the outer diameter of the cartridge 200.

Figure 3:
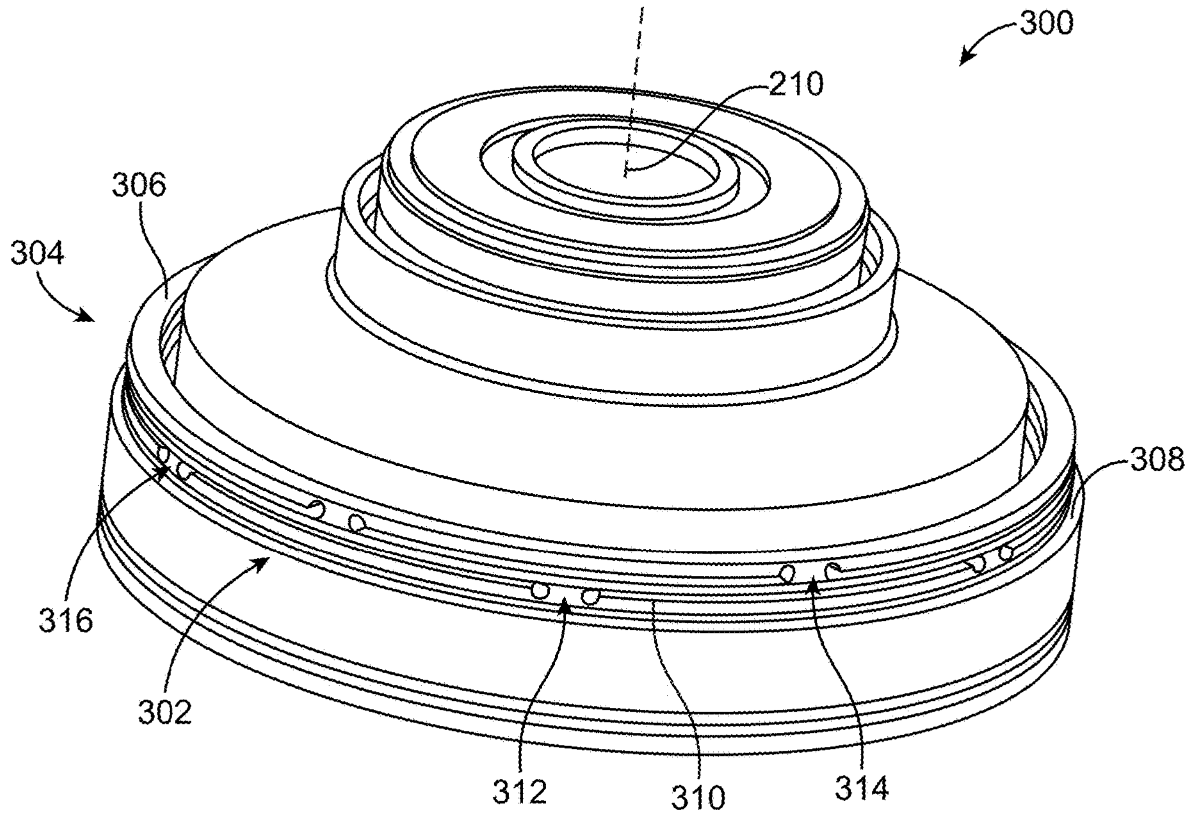
FIG. 3 is a perspective view of a head member suitable for use in a compressor in accordance with an embodiment.

Referring now to FIG. 3, a perspective view of a first head member 300 illustrating a joint interface 302 which is formed as part of, or attached to, the first head member 300 is shown. In the illustrated construction, the joint interface 302 is formed on, or is part of, an annular member 304 that extends in a direction parallel to the rotational axis 210.

In one embodiment, the joint interface 302 includes a joint face 306, a groove 308, and a plurality of slots 310. The joint face 306 is an annular surface disposed at the end of the annular member 304. In one embodiment, the joint face 306 is planar and is arranged normal to the rotational axis 210 such that during normal operation of the compressor 100 the joint face 306 resides in a vertical plane.

In various embodiments, the groove 308 may have a rectangular, U-shaped, or other suitably shaped cross-section and is arranged to extend completely around the circumference of the annular member 304. While the illustrated groove 308 is continuous and extends around the full circumference, a non-continuous or incomplete groove 308 may also be employed in some embodiments.

In one embodiment, the plurality of slots 310 are arranged in a first row of slots 312 and a second row of slots 314 with each of the rows extending around the circumference of the annular member 304. The first row of slots 312 and the second row of slots 314 are offset from one another in the direction of the rotational axis 210. Each of the plurality of slots 310 extends around a portion of the circumference and extends through the annular member 304.

In one embodiment, each end of each of the plurality of slots 310 includes an enlarged rounded portion. In alternative embodiments, each of the plurality of slots 310 may have a uniform cross-section. In one embodiment, each of the plurality of slots 310 extends around about fifty-five degrees (+/−10 degrees) of the circumference of the annular member 304 such that six slots 310 are included in each of the first row of slots 312 and the second row of slots 314. As will be appreciated by one of ordinary skill in the art, the slots 310 all extend slightly less than sixty degrees around the circumference to assure that there are bridges of solid material between each of the slots 310 in the rows 312 and 314. In other embodiments, more than six or fewer than six slots 310 could be employed in one or both of the first row of slots 312 and the second row of slots 314 with the length of the slots 310 is determined based on the number of slots 310 used in each row. In addition, one or both of the first row of slots 312 and the second row of slots 314 may include slots 310 of different lengths as may be desired. For example, the first row of slots 312 could include alternating short slots (e.g., thirty degrees) and long slots (e.g., sixty degrees) if desired. Thus, the length and number of slots 310 can be varied as may be required for the particular application.

In one embodiment, the slots 310 in the first row of slots 312 has a different width than the slots 310 in the second row of slots 314, where the width is measured in the direction of the rotational axis 210. In addition, the number of rows of slots 310 is not limited to two rows. In one example, the joint interface 302 may include three or more rows of slots 310, which may have the same or varying widths. In one embodiment, the widths of the slots 310 in one or more of the rows may be non-uniform along the length of the slot.

In one embodiment, the first row of slots 312 and the second row of slots 314 are rotationally offset from one another so that the endpoints of any adjacent slots 310 in the different rows are not aligned with one another in the direction of the rotational axis 210. In the illustrated embodiment, the first row of slots 312 and the second row of slots 314 are offset from one another by about thirty degrees. In this arrangement, the end points of each slot 310 in the second row of slots 314 are adjacent to a center portion of one of the slots 310 in the first row of slots 312. Of course, other arrangements with different rotational offsets are possible.

Figure 4:
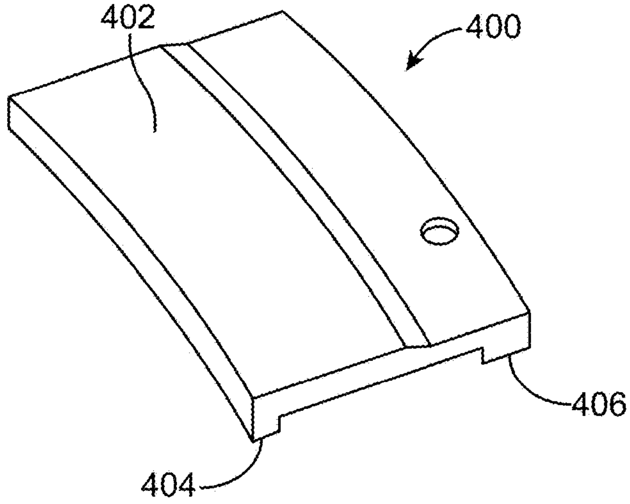
FIG. 4 is a perspective view of a clamp member suitable for use with a compressor in accordance with an embodiment.

Referring now to FIG. 4, a perspective view of a clamp member 400 is shown. As will be discussed in greater detail with respect to FIG. 5 and FIG. 6 the clamp member 400 cooperates with the inner casing 202 and the first head member 300 to maintain the joint 208. In one embodiment, the clamp member 400 includes a spine 402, a first leg 404, and a second leg 406. The spine 402 includes a rectangular cross-section that extends along an arc that is sized to closely match the curvature of the annular member 304. In the illustrated embodiment, the spine 402 extends through an arc of about sixty degrees (+/−ten degrees). As will be appreciated by one of ordinary skill in the art, in various embodiments different arc lengths are possible.

In one embodiment, the first leg 404 and the second leg 406 extend from the spine 402 with the first leg 404 having a cross-sectional shape that matches the cross-sectional shape of the groove 308 or a cross-sectional shape that can be received within the groove 308. In some embodiments, the second leg 406 has a similar cross-sectional shape as the first leg 404. However, in some embodiments, the first leg 404 and the second leg 406 may have different cross-sectional shapes.

Figure 5:
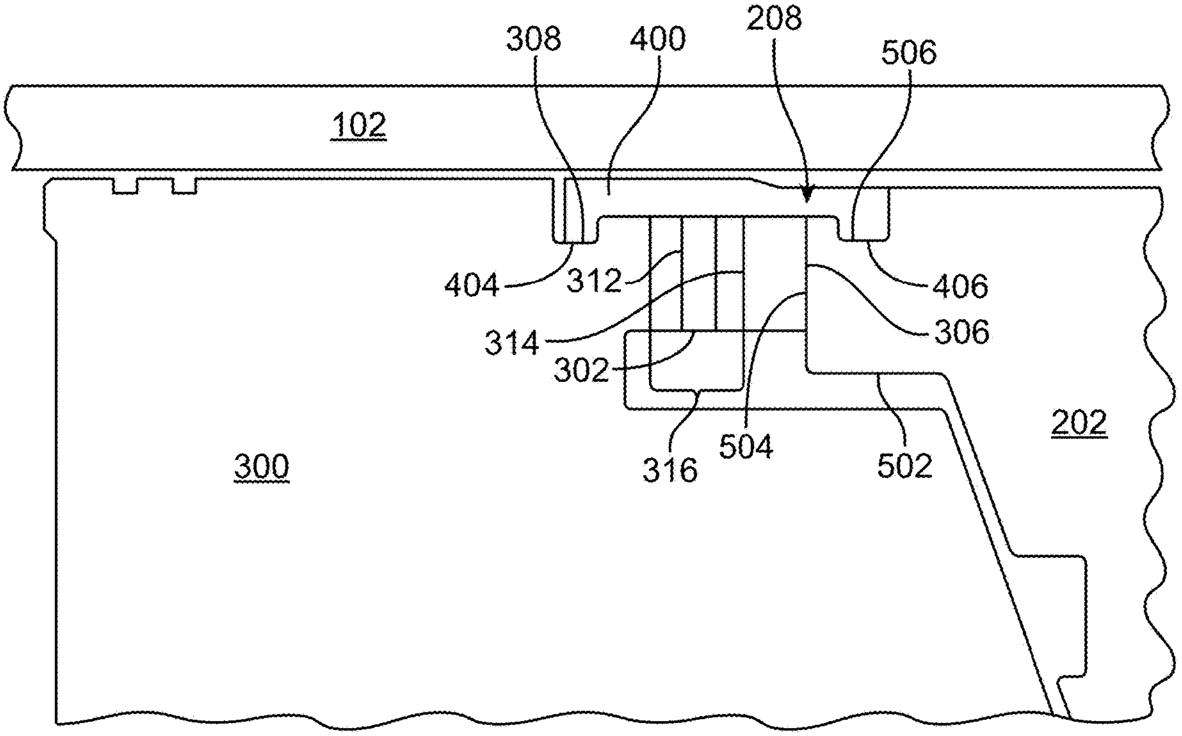
FIG. 5 is a cross-sectional view of a portion of the compressor shown in FIG. 2 taken along a plane that passes through a rotational axis of the compressor.

Referring now to FIG. 5, a cross-section of a portion of the compressor 100 schematically illustrating some of the internal components of the compressor 100 is shown. Specifically, FIG. 5 illustrates portions of the outer casing 102, the inner casing 202, and the first head member 300 in the area where the inner casing 202 and the first head member 300 meet to form the joint 208 therebetween.

In one embodiment, the first head member 300 includes a compliant element 316 formed as part of the joint interface 302. The compliant element 316 includes the first row of slots 312 and the second row of slots 314 and defines the joint face 306. In exemplary embodiments, the compliant element 316 is configured to compress in the direction of the rotational axis 210 to accommodate the thermal expansion of the inner casing 202 in the direction of the rotational axis 210 without causing movement of the first head member 300 in the direction of the rotational axis 210.

In one embodiment, the inner casing 202 includes a second joint interface 502 that includes a second joint face 504 and a second groove 506. The second joint face 504 is an annular planar surface that is arranged to abut the joint face 306 when the first head member 300 and the inner casing 202 are in their assembled positions. The second groove 506 is similar to groove 308 and extends around the circumference of the inner casing 202 with a center at the rotational axis 210. In one embodiment, the second groove 506 has a rectangular cross-sectional shape. In one embodiment, the cross-sectional shape of the second groove is selected to match the cross-sectional shape of the second leg 406 of the clamp member 400. In another embodiment, the cross-sectional shape of the second groove is selected to receive the second leg 406 of the clamp member 400. In one embodiment, the second joint interface 502 may also include a compliant element (not shown) that is similar to the compliant element 316 disposed on the joint interface 302.

In the embodiment illustrated in FIG. 5, the groove 308 and the first leg 404 cooperate to define a first clearance that is larger than a second clearance defined by the cooperation of the second groove 506 and the second leg 406. In other embodiments, similar clearances could be provided at both the first leg 404 and the second leg 406 or a larger clearance could be provided between the second groove 506 and the second leg 406 than between the groove 308 and the first leg 404, as may be desired.

In one embodiment, the clamp member 400 has an axial width (parallel to the rotational axis 210) that is selected to ensure contact between the inner surfaces of the first leg 404 and the second leg 406 with the respective groove 308 and the second groove 506 such that the desired clearance is maintained between the outer surfaces of the first leg 404 and the second leg 406 and the groove 308 and the second groove 506. With this arrangement, the clamp member 400 functions to maintain contact between the joint face 306 and the second joint face 504.

Figure 6:
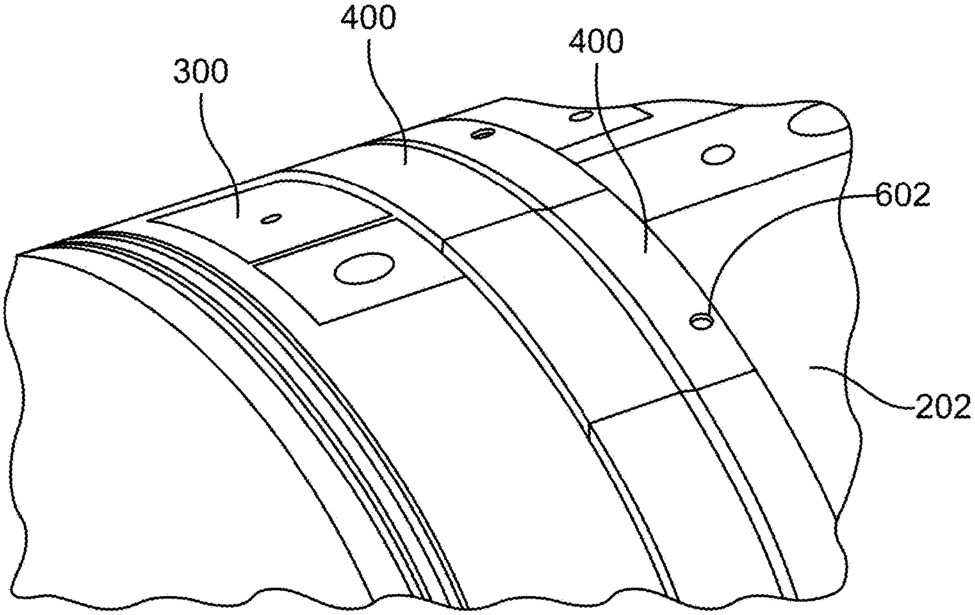
FIG. 6 is a perspective view of a portion of a compressor in accordance with an embodiment.

Referring now to FIG. 6, the arrangement of the clamp members 400 around the joint 208 formed between the inner casing 202 and the first head member 300 in accordance with an embodiment is shown. In the illustrated embodiment, each clamp member 400 extends around a portion of the circumference of the inner casing 202 and the first head member 300. In some arrangements, each clamp member 400 includes about sixty degrees (plus or minus ten degrees) of the circumference such that six clamp members 400 are used to complete the assembly of the cartridge 200. In other embodiments, a smaller number of longer clamp members 400 or a larger number of shorter clamp members 400, or a combination of clamp members having different lengths may be used.

In one embodiment, one or more fasteners 602 may be provided to facilitate the attachment of each clamp member 400 to one or both of the inner casing 202 and the first head member 300. In the illustrated embodiment, a single fastener 602 attaches each clamp member 400 to the inner casing 202.

In one embodiment, to assemble the compressor 100 the first head member 300 is positioned adjacent and coaxial to the inner casing 202. The first head member 300 is moved into contact with the inner casing 202 such that the joint face 306 and the second joint face 504 contact one another. Each of the clamp members 400 is then positioned such that the first leg 404 is received in the groove 308 and the second leg 406 is received in the second groove 506 and the clamp members are attached to one or more of the inner casing 202 and the first head member 300 with one or more of the fasteners 602. Once positioned and attached to the inner casing 202, the clamp members 400 cooperate to maintain contact between the joint face 306 and the second joint face 504.

During operation of the compressor 100, compression heats the fluid being compressed which in turn heats the inner casing 202, the first head member 300, and the outer casing 102 at different rates. Specifically, the inner casing 202 is in direct contact with or, more direct contact with the heated fluid or gases and therefore heats at a faster rate than the first head member 300 or the outer casing 102. The differential heating between the components, in particular between the inner casing 202 and the first head member 300, can produce differential thermal expansion and thermal stress that can lead to unwanted distortion or damage such as cracking of one or both of the inner casing 202 and the first head member 300.

The compliant element 316 is provided in the joint interface 302 to accommodate the differential expansion of the inner casing 202 with respect to the outer casing 102 and the first head member 300. As the inner casing 202 expands in the direction of the rotational axis 210, it moves toward the first head member 300 which is substantially restrained from movement by the outer casing 102. The various slots 310 in the joint interface 302 are arranged to allow movement of the joint face 306 with respect to the remainder of the first head member 300 to accommodate the expansion of the inner casing 202 while maintaining contact between the joint face 306 and the second joint face 504.

Thus, the arrangement illustrated herein is able to accommodate differential thermal expansion without damaging the components. This arrangement allows for lower maintenance, longer life of the components, and more rapid starts and stops that are not as limited by differential heating.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the descriptions in the present application should be read as implying that any particular element, step, act, or function is an essential element, which must be included in the claim scope: the scope of patented subject matter is defined only by the allowed claims. Moreover, none of these claims are intended to invoke a means plus function claim construction unless the exact words "means for" are followed by a participle.

What is claimed is:

1. A machine comprising:

a rotor supported for rotation about a rotational axis;

an outer casing having an inner bore;

a head member disposed within the inner bore and including a first joint interface;

an inner casing disposed within the inner bore and surrounding a portion of the rotor, the inner casing including a second joint interface that engages the first joint interface to form a joint therebetween;

a compliant element formed as part of the first joint interface and arranged to allow for movement of the second joint interface along the rotational axis in response to thermal expansion of the inner casing wherein the second joint interface includes a first groove that extends around a circumference of a first end of the inner casing and wherein the first joint interface includes a second groove that extends around a circumference of a first end of the head member, and further comprising a clamp member having a first leg engageable with the first groove and a second leg engageable with the second groove.

2. The machine of claim 1, wherein the rotor includes a plurality of centrifugal impellers arranged to define a plurality of compression stages.

3. The machine of claim 1, wherein the second joint interface includes a first joint face that extends around a circumference of a first end of the inner casing and the first joint interface includes a second joint face that extends around a circumference of a first end of the head member, and wherein the first joint face and the second joint face contact one another to form the joint therebetween.

4. The machine of claim 3, wherein the first joint face defines a first plane that is normal to the rotational axis and the second joint face defines a second plane that is normal to the rotational axis.

5. The machine of claim 3, wherein the compliant element includes an annular member that extends in a direction parallel to the rotational axis and defines a joint face.

6. The machine of claim 5, further comprising a plurality of slots formed in the annular member, each of the slots of the plurality of slots extending through the annular member.

7. The machine of claim 6, wherein each of the slots defines a length in a circumferential direction and a width in a direction parallel to the rotational axis, the length being between 20 and 1000 times longer than the width.

8. The machine of claim 6, wherein the slots are arranged in a first row and a second row that is offset a non-zero distance in a direction parallel to the rotational axis from the first row.

9. The machine of claim 8, wherein the slots in a first row are offset between 10 and 50 degrees from the slots in the second row.

10. A machine comprising:

a rotor supported for rotation about a rotational axis;

an outer casing having an inner bore;

an inner casing disposed within the inner bore and surrounding a portion of the rotor;

a head member disposed within the inner bore and coupled to the inner casing to form a joint therebetween;

a first joint interface formed as part of one of the inner casing and the head member, the first joint interface including a first joint face and a first groove that each extend around a portion of a circumference of the one of the inner casing and the head member;

a second joint interface formed as part of the other of the inner casing and the head member, the second joint interface including a second joint face and a second groove that each extend around a portion of a circumference of the other of the inner casing and the head member;

a compliant element formed as part of the second joint interface and positioned between the second joint face and the second groove, the compliant element arranged to allow movement of the one of the first joint interface and the second joint interface along the rotational axis in response to thermal expansion of the inner casing, and a clamp member having a first leg engageable with the first groove and a second leg engageable with the second groove.

11. The machine of claim 10, wherein the rotor includes a plurality of centrifugal impellers arranged to define a plurality of compression stages.

12. The machine of claim 10, wherein the first joint face defines a first plane that is normal to the rotational axis and the second joint face defines a second plane that is normal to the rotational axis.

13. The machine of claim 10, wherein the compliant element includes an annular member that extends in a direction parallel to the rotational axis and defines the second joint face.

14. The machine of claim 13, further comprising a plurality of slots formed in the annular member, each of the slots of the plurality of slots extending through the annular member.

15. The machine of claim 10, wherein the second joint interface is formed as part of the inner casing and the first joint interface and the compliant element are formed as part of the head member.

16. The machine of claim 14, wherein each of the slots defines a length in a circumferential direction and a width in a direction parallel to the rotational axis, the length being between 20 and 1000 times longer than the width, and wherein the slots are arranged in a first row and a second row that is offset a non-zero distance in a direction parallel to the rotational axis from the first row.

17. The machine of claim 16, wherein the slots in a first row are offset between 10 and 50 degrees from the slots in the second row.

* * * * *